(12) United States Patent
Kodera et al.

(10) Patent No.: US 9,413,083 B1
(45) Date of Patent: Aug. 9, 2016

(54) CONNECTOR

(71) Applicants: JAPAN AVIATION ELECTRONICS INDUSTRY, LIMITED, Shibuya-ku, Tokyo (JP); JAE TAIWAN, LTD., Taichung (TW)

(72) Inventors: Masafumi Kodera, Taichung (TW); Kazuya Mikawa, Tokyo (JP); Chien Chih Chen, Taichung (TW); Hsing Man Wang, Taichung (TW)

(73) Assignees: JAPAN AVIATION ELECTRONICS INDUSTRY, LIMITED, Tokyo (JP); JAE TAIWAN, LTD., Taichung (TW)

( * ) Notice: Subject to any disclaimer, the term of this patent is extended or adjusted under 35 U.S.C. 154(b) by 0 days.

(21) Appl. No.: 14/886,647

(22) Filed: Oct. 19, 2015

(30) Foreign Application Priority Data

Jan. 26, 2015 (JP) ................................. 2015-012358

(51) Int. Cl.
*H01R 12/88* (2011.01)
*H01R 4/48* (2006.01)

(52) U.S. Cl.
CPC ........................................ *H01R 4/48* (2013.01)

(58) Field of Classification Search
CPC .......... H01R 4/48; H01R 12/88; H01R 13/60; H01R 12/83
USPC ......... 439/326, 341, 345, 529, 530, 660, 135, 439/141, 138, 142
See application file for complete search history.

(56) References Cited

U.S. PATENT DOCUMENTS

| | | | | |
|---|---|---|---|---|
| 5,425,651 A | * | 6/1995 | Thrush | H01R 12/83 439/326 |
| 5,964,601 A | * | 10/1999 | Tsurumaru | B60R 11/02 439/141 |
| 6,193,546 B1 | * | 2/2001 | Sadler | A45F 5/02 439/165 |
| 7,033,199 B2 | * | 4/2006 | Funatsu | H01R 13/453 439/326 |
| 7,121,861 B2 | * | 10/2006 | Tseng | H01R 12/83 439/326 |
| 2011/0104941 A1 | * | 5/2011 | Chang | H01R 13/6315 439/530 |

FOREIGN PATENT DOCUMENTS

JP          2012094178 A          5/2012

* cited by examiner

*Primary Examiner* — Abdullah Riyami
*Assistant Examiner* — Harshad Patel
(74) *Attorney, Agent, or Firm* — Holtz, Holtz & Volek PC

(57) ABSTRACT

A connector comprises a supporting member, a movable member and a contact. The movable member is supported by the supporting member so as to be movable in an up-down direction. The movable member is provided with a reference surface and a protection protrusion. The protection protrusion protrudes upward from the reference surface in the up-down direction. The protection protrusion is provided with a protection portion. The contact has a contact portion. The contact portion protrudes upward through the reference surface of the movable member in the up-down direction. The contact portion is positioned inward of the protection portion in a front-rear direction perpendicular to the up-down direction. The movable member moves the contact portion of the contact downward in the up-down direction when a force along an intersecting direction is applied to the protection portion. The intersecting direction intersects with the up-down direction. When the force is released, the movable member is moved upward in the up-down direction together with the contact portion of the contact.

11 Claims, 7 Drawing Sheets

CONNECTOR

CROSS REFERENCE TO RELATED APPLICATIONS

An applicant claims priority under 35 U.S.C. §119 of Japanese Patent Application No. JP2015-012358 filed Jan. 26, 2015.

BACKGROUND OF THE INVENTION

This invention relates to a connector assembly which detachably connects two devices with each other, and to a connector constituting the connector assembly.

JP-A 2012-94178 (Patent Document 1) discloses a connector assembly of this type. Referring to FIGS. 12 to 14, the connector assembly of Patent Document 1 comprises a mating connector 910 and a connector 960. The mating connector 910 is provided on an electronic equipment 900. The connector 960 is provided on an extension unit or docking station 950, which is hereinafter referred to simply as "extension unit". When the electronic equipment 900 is mounted on a predetermined position of the extension unit 950, the connector 960 is connected with the mating connector 910.

In the connector assembly of Patent Document 1, a direction in which the electronic equipment 900 is attachable to the extension unit 950 is predetermined to be a direction A illustrated in FIG. 12. In addition, the extension unit 950 is required to have a function for guiding the attachment of the electronic equipment 900 along the direction A. Accordingly, a part of the extension unit 950 which receives the electronic equipment 900 has a large-sized structure.

SUMMARY OF THE INVENTION

It is therefore an object of the present invention to provide a connector assembly which enables a design flexibility of an extension unit to be improved by increasing the number of directions in which an electronic equipment is attachable to the extension unit. In addition, it is another object of the present invention to provide a connector constituting the connector assembly.

One aspect (first aspect) of the present invention provides a connector comprising a supporting member, a movable member and a contact. The movable member is supported by the supporting member so as to be movable in an up-down direction. The movable member is provided with a reference surface and a protection protrusion. The protection protrusion protrudes upward from the reference surface in the up-down direction. The protection protrusion is provided with a protection portion. The contact has a contact portion. The contact portion protrudes upward through the reference surface of the movable member in the up-down direction. The contact portion is positioned inward of the protection portion in a front-rear direction perpendicular to the up-down direction. The movable member moves the contact portion of the contact downward in the up-down direction when a force along an intersecting direction is applied to the protection portion. The intersecting direction intersects with the up-down direction. When the force is released, the movable member is moved upward in the up-down direction together with the contact portion of the contact.

Another aspect (second aspect) of the present invention provides a connector assembly comprising the connector of the first aspect and a mating connector. The mating connector has a receive portion and a mating contact portion. The mating connector is to be attached to a device to be used. The force is applied to the protection portion by a part of the device abutting against the protection portion along the intersecting direction. When the force is released by the protection protrusion being received in the receive portion, the contact portion is moved upward to be brought into contact with the mating contact portion.

The contact portion is positioned inward of the protection portion in the front-rear direction. Accordingly, when the device, such as the electronic equipment, which is provided with the mating connector is moved along the intersecting direction which intersects with the up-down direction, the device abuts against the protection portion of the protection protrusion before abutting against the contact portion of the contact. Thus, protection of the contact portion can be achieved.

When the device abuts against the protection portion of the protection protrusion along the intersecting direction, the movable member presses the contact portion of the contact downward. Accordingly, the contact is prevented from being buckled even if the device is further moved in the intersecting direction.

When the device and the connector are appropriately arranged with respect to each other, the device stops pressing the protection protrusion downward. Since the movable member which is provided with the protection protrusion is supported by the supporting member so as to be movable, the movable member is about to be returned to an initial position. Meanwhile, the movable member moves the contact portion of the contact upward. Accordingly, the contact portion of the contact and the mating contact portion of the mating connector are connected with each other.

As described above, the connector assembly of the present invention enables the device such as the electronic equipment to be connected with a device such as the extension unit in a direction other than the up-down direction. Accordingly, the design flexibility of the extension unit can be improved.

Figure 1:
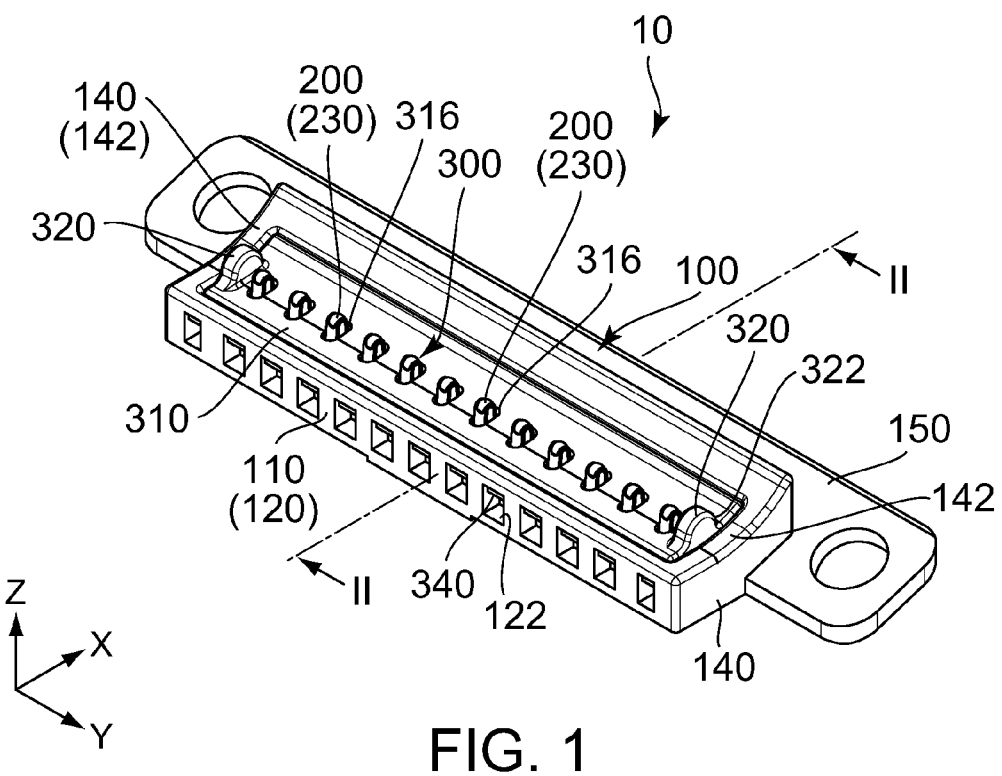
FIG. 1 is a perspective view showing a connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 8:
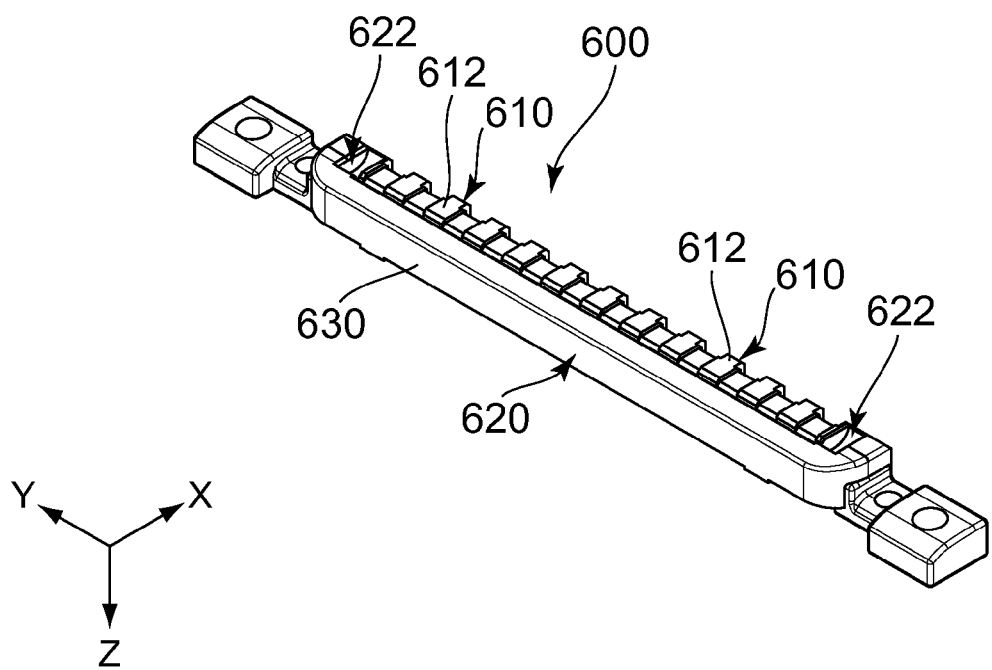
FIG. 8 is a perspective view showing a mating connector according to the embodiment of the present invention.

A connector assembly according to an embodiment of the present invention comprises a connector 10 shown in FIG. 1 and a mating connector 600 shown in FIG. 8.

Figure 9:
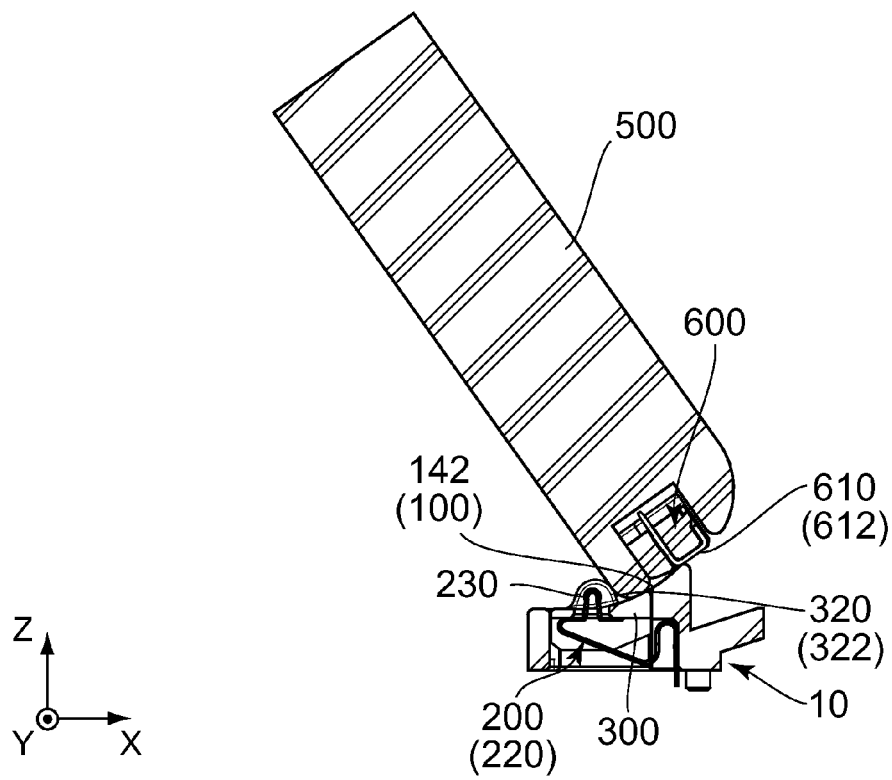
FIG. 9 is a cross-sectional view showing a state of a process where the connector and the mating connector according to the embodiment of the present invention are connected with each other.
Figure 10:
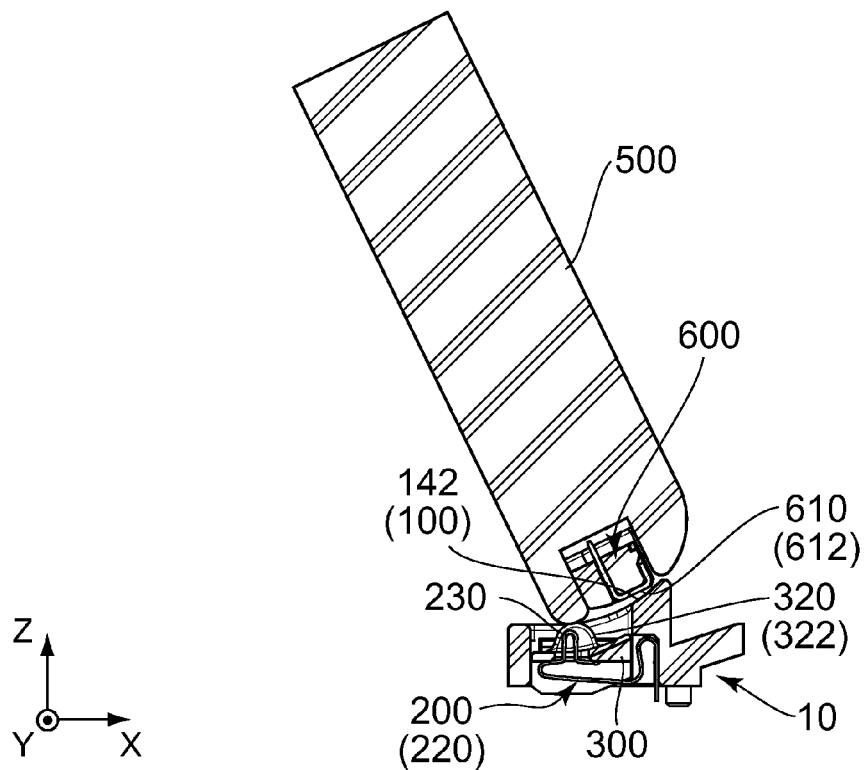
FIG. 10 is a cross-sectional view showing a state following the state of FIG. 9.
Figure 11:
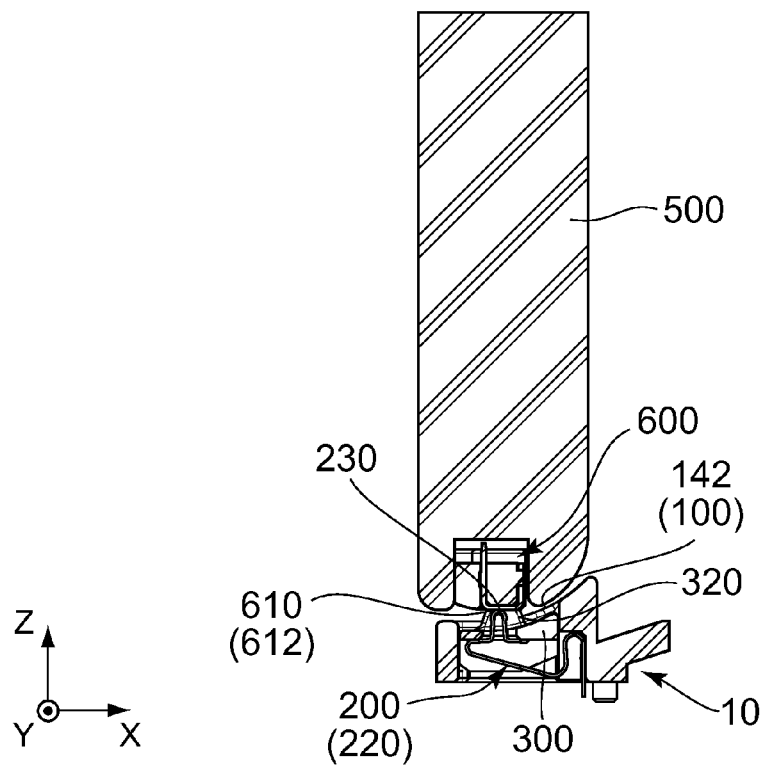
FIG. 11 is a cross-sectional view showing a state following the state of FIG. 10.
Figure 12:
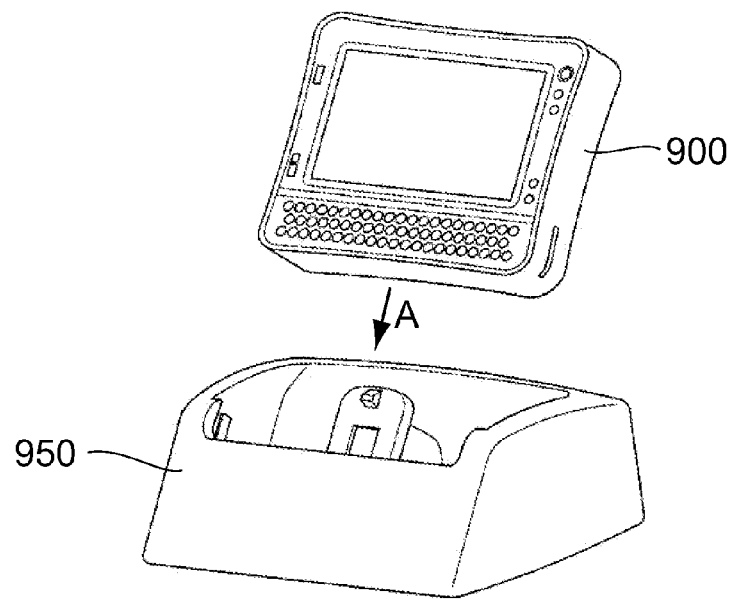
FIG. 12 is a perspective view showing an electronic equipment and an extension unit of Patent Document 1.
Figure 13:
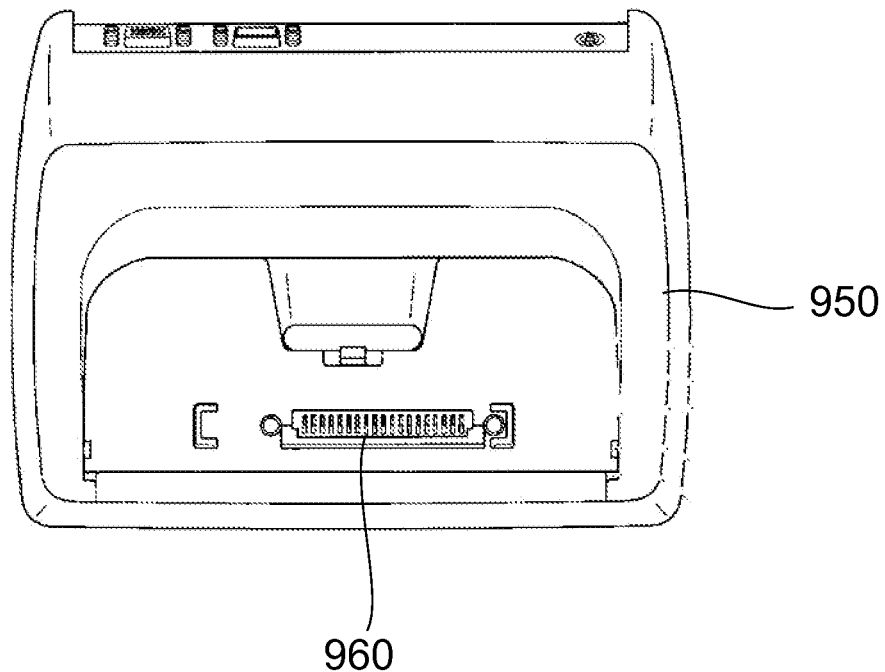
FIG. 13 is a top view showing the extension unit of FIG. 12. A connector, which is included in a connector assembly of Patent Document 1, is illustrated therein.
Figure 14:
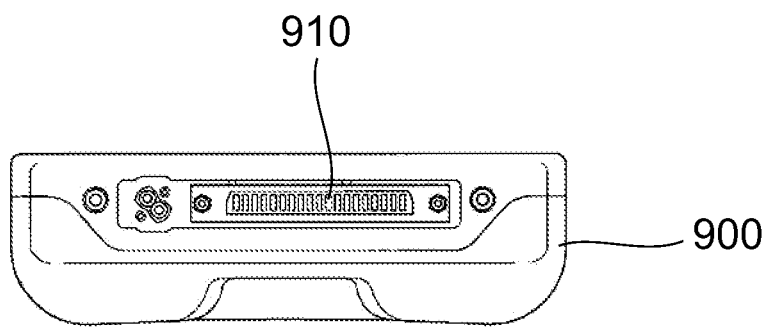
FIG. 14 is a bottom view showing the electronic equipment of FIG. 12. A mating connector, which is included in the connector assembly of Patent Document 1, is illustrated therein.

In the present embodiment, as shown in FIGS. 9 to 11, the mating connector 600 is expected to be installed into a tablet apparatus (device) 500. In addition, the connector 10 of FIG. 1 is expected to be installed into an extension unit (not shown) which has a keyboard. However, the present invention is not limited thereto. The concept of the present invention is applicable to any connector assembly which electrically connects between two devices.

As shown in FIG. 8, the mating connector 600 comprises a plurality of mating contacts 610 and a mating holding member 620. Each of the mating contacts 610 is made of conductor. The mating holding member 620 is made of insulator. The mating contacts 610 are held by the mating holding member 620 and are arranged in a row in a Y-direction. In the present embodiment, the Y-direction is a lateral direction. Each of the mating contacts 610 is provided with a mating contact portion 612. Each of the mating contact portions 612 is exposed on the mating holding member 620. The mating holding member 620 is provided with two receive portions 622 and a mating protection portion 630. In the lateral direction, the two receive portions 622 are positioned at opposite positions, respectively, which are beyond the row of the mating contacts 610. Specifically, the mating contacts 610 are positioned between the receive portions 622 in the lateral direction. Each of the receive portions 622 is recessed in a Z-direction. The Z-direction is an up-down direction perpendicular to the lateral direction. Especially, a bottom surface of each of the receive portions 622 of the present embodiment has a circular arc-like shape in a plane perpendicular to the lateral direction. The mating protection portion 630 has a shape extending long in the lateral direction. The mating protection portion 630 and the row of the mating contacts 610 are arranged in an X-direction. The X-direction is a front-rear direction perpendicular to both the lateral direction and the up-down direction. The mating protection portion 630 protects the row of the mating contacts 610 in the front-rear direction.

Figure 2:
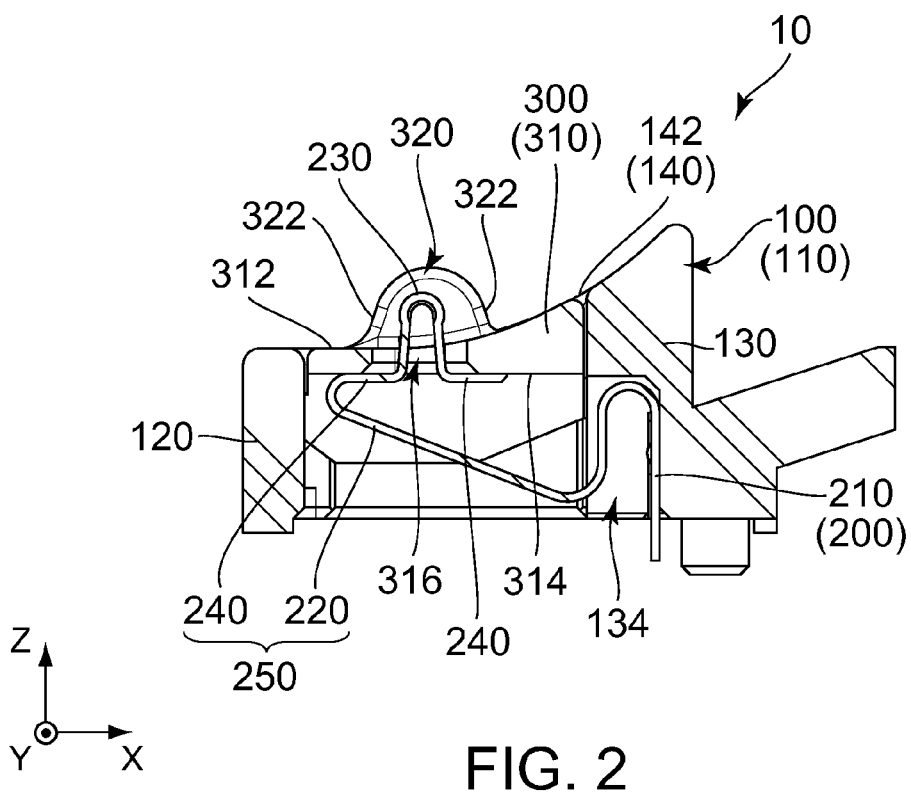
FIG. 2 is a cross-sectional view showing the connector of FIG. 1, taken along line II-II.

As shown in FIGS. 1 and 2, the connector 10 of the present embodiment comprises a holding member 100, a plurality of contacts 200 and a movable member 300. The holding member 100 is made of insulator. Each of the contacts 200 is made of conductor. The movable member 300 is made of insulator. In the present embodiment, the holding member 100 and the movable member 300 are distinct and separated from each other.

Figure 3:
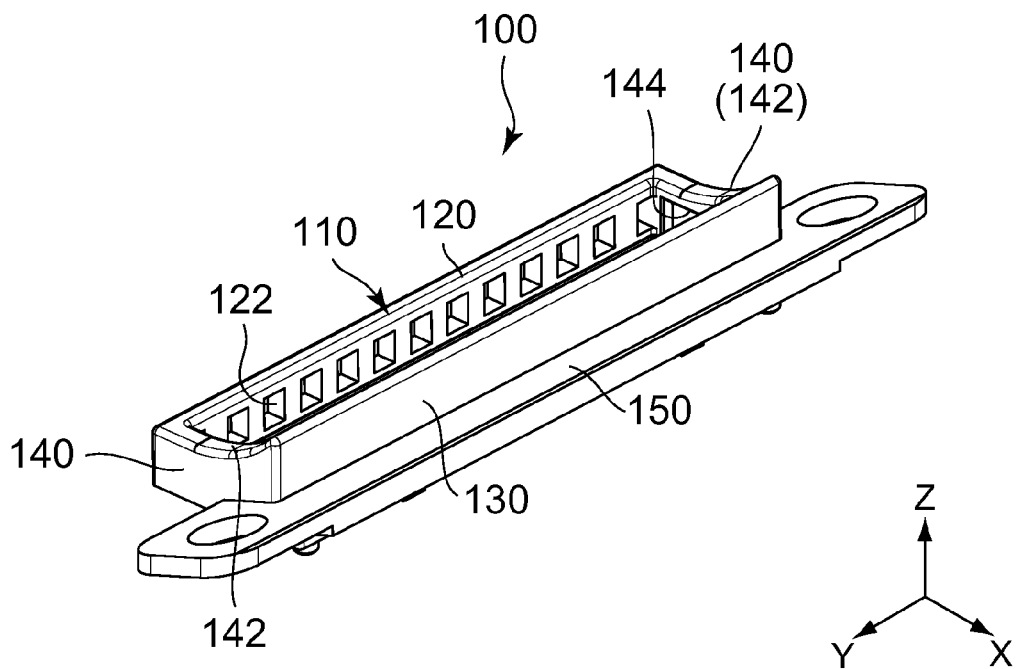
FIG. 3 is a rear, perspective view showing a holding member which is included in the connector of FIG. 1.
Figure 4:
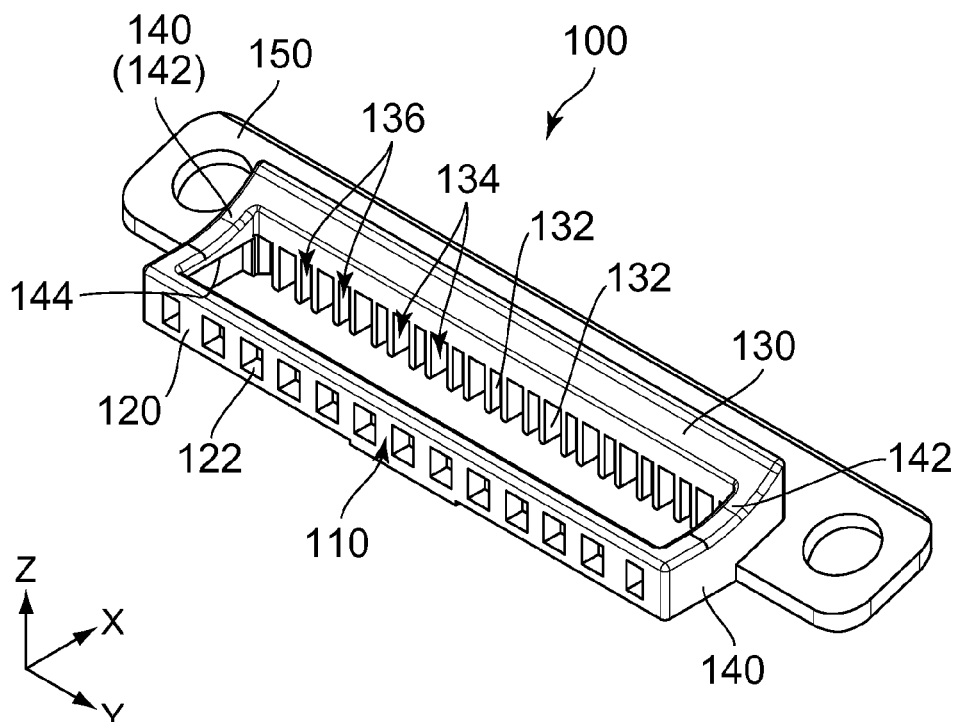
FIG. 4 is a front, perspective view showing the holding member of FIG. 3.

As shown in FIGS. 3 and 4, the holding member 100 has a frame body 110 and a fixed portion 150. The fixed portion 150 is used for fixing the frame body 110 to the extension unit (not shown).

As shown in FIGS. 3 and 4, the frame body 110 has a shape which is long in the lateral direction and short in the front-rear direction. The frame body 110 has a front portion 120, a rear portion 130 and two side portions 140. As understood from the above description and FIGS. 3 and 4, a negative X-direction is a front direction and a positive X-direction is a rear direction.

As shown in FIGS. 3 and 4, the front portion 120 is provided with a plurality of regulating openings 122. The regulating openings 122 are arranged in the lateral direction. Each of the regulating openings 122 pierces the front portion 120 along the front-rear direction.

As shown in FIG. 4, the rear portion 130 is formed with a plurality of partitions 132. Each set of neighboring two of the partitions 132 and a space defined thereby forms any one of a holding portion 134 and an auxiliary regulating portion 136. The holding portions 134 and the auxiliary regulating portions 136 are alternately arranged in the lateral direction.

As understood from FIGS. 3 and 4, each of the side portions 140 is formed with a guide portion 142 and a first defining portion 144.

The guide portion 142 is formed of an upper surface of the side portion 140 and intersects with both the up-down direction and the front-rear direction. As understood from FIGS. 9 to 11, when the connector 10 and the mating connector 600 are connected with each other, the guide portions 142 guide parts of the tablet apparatus 500, respectively.

Although each of the guide portions 142 of the present embodiment is formed as a part of the holding member 100 which is distinct and separated from the movable member 300, the present invention is not limited thereto. Each of the guide portions 142 may be formed of a member other than the holding member 100, provided that each of the guide portions 142 is distinct and separated from the movable member 300. For example, each of the guide portions 142 may be formed by using a part of the extension unit (not shown) to which the connector 10 is attached.

As shown in FIGS. 3 and 4, each of the first defining portions 144 is formed inside the corresponding side portion 140 in the lateral direction. Specifically, an inside wall of each of the side portions 140 is recessed outward in the lateral direction. An upper inside surface of the recessed inside wall functions as the first defining portion 144. Explanation about a function of the first defining portion 144 will be made below in conjunction with explanation about the movable member 300.

Figure 5:
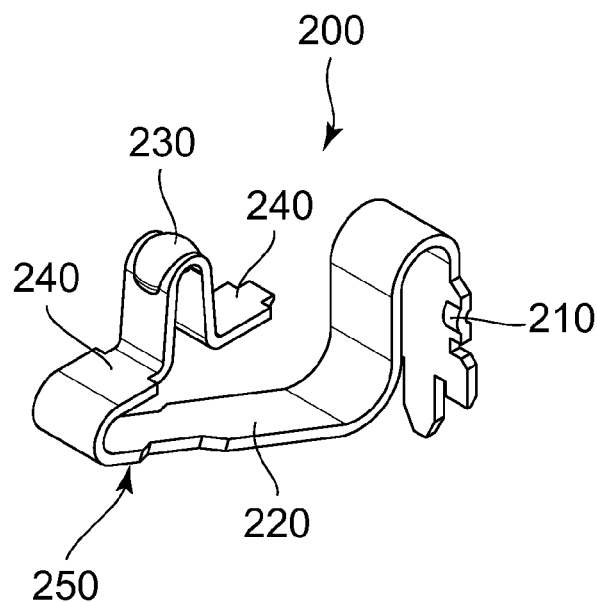
FIG. 5 is a perspective view showing a contact which is included in the connector of FIG. 1.

As shown in FIG. 5, each of the contacts 200 has a held portion 210, a spring portion 220, a contact portion 230 and a supporting portion 240. As shown in FIG. 2, the held portions 210 are held by the holding portions 134 of the holding member 100, respectively. As shown in FIGS. 2 and 5, the spring portion 220 extends from the held portion 210. The spring portion 220 is resiliently deformable and has a spring property. The contact portion 230 and the supporting portion 240 are supported by the spring portion 220 so as to be movable at least in the up-down direction. In the present embodiment, as described later, the spring portion 220 and the supporting portion 240 form a supporting member 250 which supports the movable member 300 so that the movable member 300 is movable in the up-down direction. In other words, the supporting member 250 of the present embodiment is formed as a part of the contact 200.

As shown in FIGS. 1 and 2, the movable member 300 is surrounded by the frame body 110 of the holding member 100 in a plane perpendicular to the up-down direction, namely, in an XY-plane.

Figure 6:
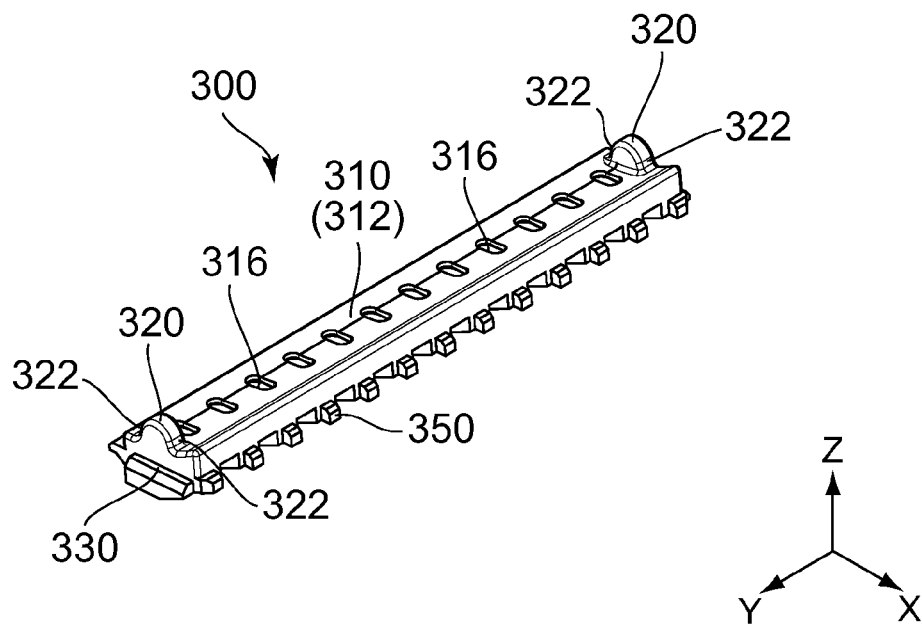
FIG. 6 is a rear, perspective view showing a movable member which is included in the connector of FIG. 1.
Figure 7:
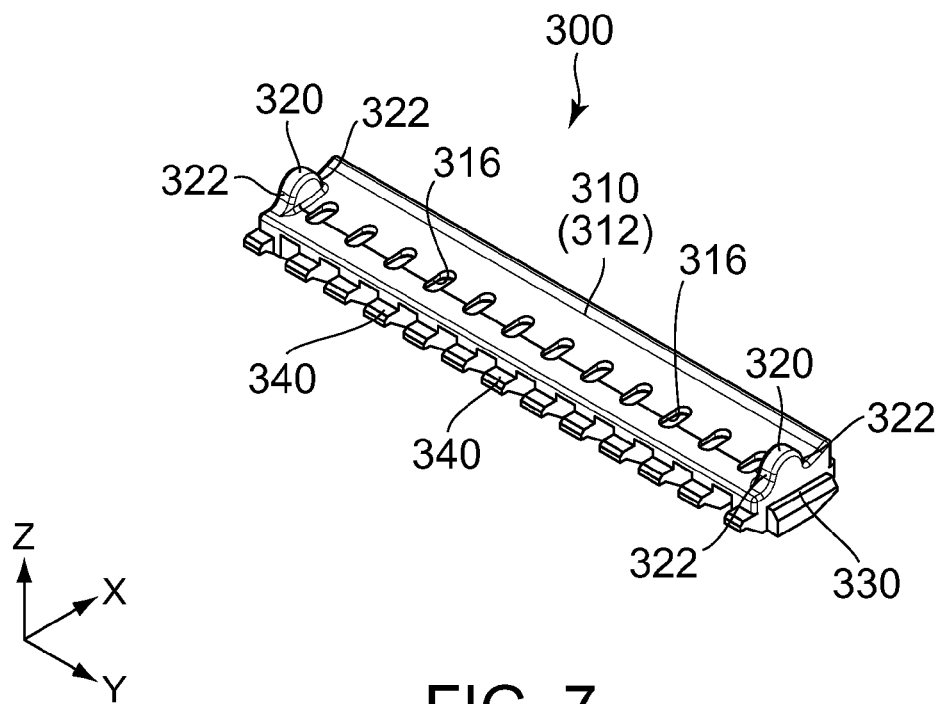
FIG. 7 is a front, perspective view showing the movable member of FIG. 6.

As shown in FIGS. 6 and 7, the movable member 300 has an upper wall portion 310, two protection protrusions 320, two second defining portions 330, a plurality of regulating protrusions 340 and a plurality of auxiliary regulating protrusions 350.

As understood from FIGS. 2, 6 and 7, the upper wall portion 310 has an upper surface 312 and a lower surface 314. Specifically, the upper surface 312 has a curved shape, and the lower surface 314 has a planar shape. In the present embodiment, the upper surface 312 of the upper wall portion 310 is referred to also as "reference surface 312".

As shown in FIG. 2, the lower surface 314 of the upper wall portion 310 is supported by the supporting portions 240 of the contacts 200. Accordingly, the upper wall portion 310 is movable in the up-down direction by using the resilience of the spring portions 220. In other words, the movable member 300 of the present embodiment is supported by the supporting members 250, each of which is formed of the spring portion 220 and the supporting portion 240, so as to be movable in the up-down direction. In the present embodiment, each of the supporting portions 240 only receives the lower surface 314 of the upper wall portion 310 and is not fixed to the upper wall portion 310. However, the present invention is not limited thereto. Each of the supporting portions 240 may be fixed to the upper wall portion 310. Specifically, a part of each of the contacts 200 may be fixed to the movable member 300. Although each of the supporting portions 240 of the present embodiment is brought into contact with the lower surface 314 of the upper wall portion 310 under an initial state shown in FIG. 2, gaps may be provided between the supporting portions 240 and the lower surface 314 of the upper wall portion 310 under the initial state so that the lower surface 314 of the upper wall portion 310 is brought into contact with the supporting portions 240 when each of the protection protrusions 320 is pressed downward by a predetermined amount. In other words, the movable member 300 may not be always brought into contact with the supporting portions 240.

Referring to FIGS. 2, 6 and 7, the upper wall portion 310 is formed with a plurality of holes 316 which correspond to the contacts 200, respectively. The holes 316 are arranged in the lateral direction. The contact portion 230 of each of the contacts 200 protrudes upward through the corresponding hole 316 in the up-down direction. In other words, the contact portion 230 of each of the contacts 200 protrudes upward through the reference surface 312 of the movable member 300 in the up-down direction. Each of the contact portions 230 protrudes from the reference surface 312 by a first protrusion amount.

The protection protrusions 320 are portions which are received in the receive portions 622, respectively, of the mating connector 600 of FIG. 8 when the connector 10 of FIG. 1 is connected with the mating connector 600 of FIG. 8. The connector 10 is roughly positioned relative to the mating connector 600 by each of the protection protrusions 320 being received in the corresponding receive portion 622. The number of the protection protrusions 320 of the present embodiment is two, and the protection protrusions 320 of the present embodiment are positioned away from each other in the lateral direction. Accordingly, the connector 10 can be properly positioned relative to the mating connector 600 without increasing a size of each of the protection protrusions 320 in the lateral direction. In addition, all of the holes 316 are positioned between the two protection protrusions 320 in the lateral direction. Thus, an arrangement of the contacts 200, which is used in a case where the protection protrusions 320 are provided on the movable member 300, can be same as an arrangement of the contacts 200 which is used in a case where the protection protrusions 320 are not provided thereon.

Referring to FIG. 2, each of the protection protrusions 320 protrudes upward from the upper surface 312 of the upper wall portion 310. Specifically, each of the protection protrusions 320 protrudes upward from the reference surface 312 in the up-down direction. Each of the protection protrusions 320 protrudes from the reference surface 312 by a second protrusion amount. In other words, the second protrusion amount is a protruding amount of the protection protrusion 320 from the reference surface 312. As apparent from FIG. 2, the first protrusion amount which is a protruding amount of the contact portion 230 is smaller than the second protrusion amount. In other words, each of the protection protrusions 320 protrudes above each of the contact portions 230.

In particular, as shown in FIG. 2, each of the protection protrusions 320 of the present embodiment has a circular arc-like outer shape in a plane which is defined by the up-down direction and the front-rear direction, namely, in an XZ-plane. Specifically, in the plane which is defined by the up-down direction and the front-rear direction, the outer shape of each of the protection protrusions 320 is formed to have a curved surface. Accordingly, as shown in FIGS. 9 to 11, each of the protection protrusions 320 is smoothly moved downward when the tablet apparatus 500 abuts against the protection protrusions 320 along an intersecting direction, which intersects with the up-down direction, to apply forces thereto. In addition, the intersecting direction of the present embodiment is a direction along the guide portion 142. However, each of the protection protrusions 320 may have any outer shape, provided that a force applied from the intersecting direction can be converted to a downward force. For example, each of the protection protrusions 320 may have a cuboid outer shape, depending on a shape of the tablet apparatus 500.

Referring to FIG. 2, when forces along the intersecting direction are applied to protection portions 322 of the protection protrusions 320, respectively, the movable member 300 is moved downward in the up-down direction so that the movable member 300 moves the contact portions 230 of the contacts 200 downward in the up-down direction. When the applied forces are released, the movable member 300 is pushed up by the spring portions 220 and the supporting portions 240 of the contacts 200 to be moved upward in the up-down direction together with the contact portions 230 of the contacts 200.

As shown in FIGS. 9 to 11, when the tablet apparatus 500 is moved along the intersecting direction, the tablet apparatus 500 abuts firstly against the protection portions 322 of the protection protrusions 320. In a case where the intersecting direction is bidirectional, namely, in a case where the tablet apparatus 500 might abut against either of opposite sides of each of the protection protrusions 320 in the intersecting direction, each of the protection protrusions 320 is provided with two of the protection portions 322. In this case, each of the contact portions 230 is positioned between the two of the protection portions 322 in the intersecting direction. In order to more surely prevent the contact portions 230 from being buckled, each of the contact portions 230 is preferred to be positioned between the two of the protection portions 322 in the front-rear direction. Specifically, each of the contact portions 230 is preferred to be positioned inward of each of the two of the protection portions 322 in the front-rear direction. On the other hand, a direction in which the tablet apparatus 500 is moved is predetermined, depending on a shape of the extension unit (not shown). In a case where the intersecting direction is unidirectional as described above, each of the protection protrusions 320 may be provided with only the single protection portion 322. Also in this case, in order that the tablet apparatus 500 abuts not against the contact portions 230 but against the protection portions 322 when the tablet apparatus 500 is moved along the intersecting direction, each of the contact portions 230 needs to be positioned inward of the single protection portion 322 in the intersecting direction. In order to more surely prevent the contact portions 230 from being buckled, each of the contact portions 230 is preferred to be positioned inward of the single protection portion 322 in the front-rear direction.

As shown in FIGS. 6 and 7, the second defining portions 330 are positioned at opposite ends, respectively, of the movable member 300 in the lateral direction, and protrude outward in the lateral direction. Each of the second defining portions 330 extends long in the front-rear direction. When the movable member 300 is moved upward under a state where the movable member 300 is accommodated in the frame body 110 of the holding member 100, or under a state shown in FIGS. 1 and 2, the second defining portions 330, as shown in FIGS. 6 and 7, of the movable member 300 abut against the first defining portions 144, as shown in FIGS. 3 and 4, of the holding member 100, respectively, so that the movable member 300 is prevented from being moved further upward. Thus, the first defining portions 144 and the second defining portions 330 define an uppermost position of the movable member 300.

As shown in FIG. 7, each of the regulating protrusions 340 protrudes forward. Referring to FIGS. 1, 4 and 7, the regulating protrusions 340 are received in the regulating openings 122 of the holding member 100, respectively.

The regulating protrusions 340 define a movable range of the movable member 300 in the up-down direction. In detail, an upper limit of the movable range is positioned at a position where an upper end of each of the regulating protrusions 340 abuts against an upper end of the corresponding regulating opening 122, and a lower limit of the movable range is positioned at a position where a lower end of each of the regulating protrusions 340 abuts against a lower end of the corresponding regulating opening 122. In particular, since the lower limit of the movable range is defined as described above, the spring portion 220, shown in FIG. 2, of each of the contacts 200 can be prevented from being excessively bent so that the contacts 200 can be prevented from being plastically deformed. In order not to obstruct movements of the protection protrusions 320 in the up-down direction, a size in the up-down direction of the movable range of the movable member 300 is preferred to be configured larger than the second protrusion amount of the protection protrusion 320, namely, the range of the protruding amount of the protection protrusion 320 from the reference surface 312.

Referring to FIGS. 1, 4 and 7, in the lateral direction, each of the regulating protrusions 340 of the present embodiment has a size slightly smaller than that of the corresponding regulating opening 122. Accordingly, a movement of the movable member 300 in the lateral direction is regulated under a state where each of the regulating protrusions 340 is received in the corresponding regulating opening 122.

As shown in FIG. 6, each of the auxiliary regulating protrusions 350 protrudes rearward. As understood from FIGS. 4 and 6, the auxiliary regulating protrusions 350 are received in the auxiliary regulating portions 136 of the holding member 100, respectively. When each of the auxiliary regulating protrusions 350 is moved upward, each thereof abuts against an upper end of the corresponding auxiliary regulating portion 136 so that each thereof cannot be moved further upward. Furthermore, in the lateral direction, each of the auxiliary regulating protrusions 350 of the present embodiment has a size slightly smaller than that of the corresponding auxiliary regulating portion 136 of the holding member 100. Accordingly, the movement of the movable member 300 in the lateral direction is regulated under a state where each of the auxiliary regulating protrusions 350 is received in the corresponding auxiliary regulating portion 136.

In a case where the connector 10 comprising the aforementioned configuration is installed into the extension unit (not shown) while the mating connector 600 is installed into the tablet apparatus 500, the connector 10 and the mating connector 600 are connected with each other as shown in FIGS. 9 to 11. As shown in FIG. 9, the guide portions 142 of the holding member 100 guide the parts of the tablet apparatus 500 to the protection protrusions 320, respectively, in the intersecting direction. Each of the parts of the tablet apparatus 500 abuts against the protection portion 322 of the corresponding protection protrusion 320 along the intersecting direction so that forces are applied to the protection portions 322, respectively. Accordingly, as shown in FIG. 10, each of the protection protrusions 320 is moved downward, and each of the contact portions 230 of the contacts 200 is also moved downward together with the downward movements of the protection protrusions 320. Referring to FIGS. 8 and 11, when each of the protection protrusions 320 is received in the corresponding receive portion 622 of the mating connector 600, the forces applied to the protection protrusions 320 are released. The release causes that the movable member 300 is moved upward while the contact portions 230 of the contacts 200 are moved upward to be brought into contact with the mating contact portions 612 of the mating contacts 610, respectively. Thus, according to the present embodiment, the tablet apparatus 500 can be attached to the extension unit (not shown) not only in the up-down direction but also in the intersecting direction intersecting with the up-down direction.

In addition, in the present embodiment, the first protrusion amount which is the protruding amount of the contact portion 230 is smaller than the second protrusion amount which is the protruding amount of the protection protrusion 320. Accordingly, when the tablet apparatus 500 is attached to the extension units (not shown) as described above, the contact portions 230 are never brought into contact with the tablet apparatus 500. Thus, the tablet apparatus 500 can be prevented from being damaged by the contact portions 230.

In the aforementioned embodiment, the bottom surface of the receive portion 622 has the circular arc-like shape in the plane perpendicular to the lateral direction. However, the present invention is not limited thereto. Each of the receive portions 622 may have any shape, provided that each of the receive portions 622 can properly receive the corresponding protection protrusion 320.

In the aforementioned embodiment, the movable member 300 is supported by the supporting members 250 so as to be movable in the up-down direction, and the supporting member 250 is formed as a part of the contact 200. However, the present invention is not limited thereto. For example, the connector 10 may comprise a resilient member, such as a coil spring, which is distinct and separated from the contacts 200, to use the resilient member as a supporting member.

The present application is based on a Japanese patent application of JP2015-012358 filed before the Japan Patent Office on Jan. 26, 2015, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising a supporting member, a movable member and a contact, wherein:
    the movable member is supported by the supporting member so as to be movable in an up-down direction;
    the movable member is provided with a reference surface and a protection protrusion;
    the protection protrusion protrudes upward from the reference surface in the up-down direction;
    the protection protrusion is provided with a protection portion;
    the contact has a contact portion;
    the contact portion protrudes upward through the reference surface of the movable member in the up-down direction;
    the contact portion is positioned inward of the protection portion in a front-rear direction perpendicular to the up-down direction;
    the movable member moves the contact portion of the contact downward in the up-down direction when a force along an intersecting direction is applied to the protection portion, the intersecting direction intersecting with the up-down direction; and
    when the force is released, the movable member is moved upward in the up-down direction together with the contact portion of the contact.

2. The connector as recited in claim 1, wherein:
    the contact portion of the contact protrudes from the reference surface by a first protrusion amount;
    the protection protrusion protrudes from the reference surface by a second protrusion amount; and
    the first protrusion amount is smaller than the second protrusion amount.

3. The connector as recited in claim 1, wherein the protection protrusion has a circular arc-like outer shape in a plane which is defined by the up-down direction and the front-rear direction.

4. The connector as recited in claim 1, wherein the supporting member is formed as a part of the contact.

5. The connector as recited in claim 1, wherein:
    the connector is to be connected with a mating connector which is attached to a device;
    the connector has a guide portion which is distinct and separated from the movable member; and
    the guide portion guides a part of the device to the protection protrusion in the intersecting direction.

6. The connector as recited in claim 5, wherein the guide portion intersects with both the up-down direction and the front-rear direction.

7. The connector as recited in claim 5, wherein:
    the connector further comprises a holding member which surrounds the movable member in a plane perpendicular to the up-down direction; and
    the guide portion is formed as a part of the holding member.

8. The connector as recited in claim 7, wherein:
    the holding member is formed with a regulating opening;
    the movable member is provided with a regulating protrusion;
    the regulating protrusion is received in the regulating opening; and
    the regulating protrusion defines a movable range of the movable member in the up-down direction.

9. The connector as recited in claim 8, wherein:
    the regulating protrusion protrudes in the front-rear direction; and
    the regulating protrusion which is received in the regulating opening regulates a movement of the movable member in a lateral direction perpendicular to both the up-down direction and the front-rear direction.

10. The connector as recited in claim 8, wherein the movable range is larger than a protruding amount of the protection protrusion from the reference surface.

11. A connector assembly comprising the connector as recited in claim 1 and a mating connector, wherein:
    the mating connector has a receive portion and a mating contact portion;
    the mating connector is to be attached to a device to be used;
    the force is applied to the protection portion by a part of the device abutting against the protection portion along the intersecting direction; and
    when the force is released by the protection protrusion being received in the receive portion, the contact portion is moved upward to be brought into contact with the mating contact portion.

* * * * *